(12) United States Patent
Henry (10) Patent No.: US 11,748,923 B2
(45) Date of Patent: Sep. 5, 2023

(54) SYSTEM AND METHOD FOR PROVIDING MORE READABLE FONT CHARACTERS IN SIZE ADJUSTING AVIONICS CHARTS

(71) Applicant: Rockwell Collins, Inc., Cedar Rapids, IA (US)

(72) Inventor: Jeff M. Henry, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 3 days.

(21) Appl. No.: 17/525,685

(22) Filed: Nov. 12, 2021

(65) Prior Publication Data

US 2023/0154074 A1    May 18, 2023

Related U.S. Application Data

(60) Provisional application No. 63/278,576, filed on Nov. 12, 2021.

(51) Int. Cl.
*G06T 11/20* (2006.01)
*G06T 3/40* (2006.01)

(52) U.S. Cl.
CPC ............ *G06T 11/203* (2013.01); *G06T 3/40* (2013.01); *G06T 11/206* (2013.01)

(58) Field of Classification Search
CPC ........ G06T 11/206; G06T 3/40; G06T 11/203
See application file for complete search history.

(56) References Cited

U.S. PATENT DOCUMENTS

| | | | |
|---|---|---|---|
| 3,522,586 A | 8/1970 | Kiji et al. | |
| 3,656,178 A | 4/1972 | Maine et al. | |
| 4,096,527 A | 6/1978 | Furuta | |
| 4,792,981 A | 12/1988 | Cahill, III et al. | |
| 4,876,651 A | 10/1989 | Dawson et al. | |
| 5,050,230 A | 9/1991 | Jones et al. | |

(Continued)

FOREIGN PATENT DOCUMENTS

| | | |
|---|---|---|
| CA | 3095088 C | 2/2021 |
| CN | 100440222 C | 12/2008 |

(Continued)

OTHER PUBLICATIONS

ArcGIS, "Introduction to export a map or layout", retrieved from the Internet Nov. 11, 2021.

(Continued)

*Primary Examiner* — Michelle L Sams (74) *Attorney, Agent, or Firm* — Suiter Swantz pc llo (57) ABSTRACT

A system and method for flight chart font character scaling is disclosed. A host computing device is configured to: detect a font character size of a font character in a flight chart file, associate a threshold zoom level with the font character based on the respective font character size, and convert the flight chart file to aircraft display hardware directives. An aircraft display is configured to display a flight chart using the aircraft display hardware directives. An aircraft computing device is configured to detect a current zoom level of the aircraft display, compare the current zoom level to the threshold zoom level, set a drawing mode of a font character reference as a stroked mode or a filled mode, and present a referenced character as a filled character or a stroked character based on the drawing mode.

17 Claims, 4 Drawing Sheets

(56) References Cited

U.S. PATENT DOCUMENTS

| | | |
|---|---|---|
| 5,428,692 A | 6/1995 | Kuehl |
| 5,454,076 A | 9/1995 | Cain et al. |
| 5,499,382 A | 3/1996 | Nusinov et al. |
| 5,537,669 A | 7/1996 | Evans et al. |
| 5,559,707 A | 9/1996 | DeLorme et al. |
| 5,577,170 A | 11/1996 | Karow |
| 5,936,637 A | 8/1999 | Seto |
| 5,978,715 A | 11/1999 | Briffe et al. |
| 6,014,133 A | 1/2000 | Yamakado et al. |
| 6,275,610 B1 | 8/2001 | Hall, Jr. et al. |
| 6,320,984 B1 | 11/2001 | Shigeta |
| 6,448,922 B1 | 9/2002 | Kelly |
| 6,501,441 B1 | 12/2002 | Ludtke et al. |
| 6,839,714 B2 | 1/2005 | Wheeler et al. |
| 7,039,505 B1 | 5/2006 | Southard et al. |
| 7,096,211 B2 | 8/2006 | Fujihara |
| 7,173,738 B2 | 2/2007 | Kohn |
| 7,552,010 B2 | 6/2009 | Saito |
| 7,552,011 B2 | 6/2009 | Ishii et al. |
| 7,562,289 B2 | 7/2009 | Bufkin et al. |
| 7,581,036 B2 | 8/2009 | Powell et al. |
| 7,609,263 B2 | 10/2009 | Nagasaki et al. |
| 7,739,622 B2 | 6/2010 | DeLine et al. |
| 7,777,749 B2 | 8/2010 | Chung et al. |
| 7,948,502 B2 | 5/2011 | Stanton |
| 7,966,609 B2 | 6/2011 | Serebryany |
| 8,035,642 B2 | 10/2011 | Suzuki |
| 8,165,732 B2 | 4/2012 | Corbefin et al. |
| 8,169,505 B2 | 5/2012 | Hoshi |
| 8,306,745 B1 | 11/2012 | Clark et al. |
| 8,339,417 B2 | 12/2012 | Stroila et al. |
| 8,374,390 B2 | 2/2013 | Stroila et al. |
| 8,379,065 B2 | 2/2013 | Nam et al. |
| 8,515,658 B1 | 8/2013 | Foster et al. |
| 8,583,368 B1 | 11/2013 | Sindlinger et al. |
| 8,704,732 B2 | 4/2014 | Pourbigharaz et al. |
| 8,937,737 B2 | 1/2015 | Tsutsumi et al. |
| 9,035,969 B2 | 5/2015 | Ivashin et al. |
| 9,195,637 B2 | 11/2015 | Peraza et al. |
| 9,430,195 B1 | 8/2016 | Pecoraro et al. |
| 9,443,433 B1 | 9/2016 | Conway et al. |
| 9,465,513 B2 | 10/2016 | Sims |
| 9,489,121 B2 | 11/2016 | Davis et al. |
| 9,547,727 B2 | 1/2017 | Passani et al. |
| 9,619,919 B1 | 4/2017 | Postnikov et al. |
| 9,639,309 B1 | 5/2017 | Pugh |
| 9,671,935 B2 | 6/2017 | Miichi et al. |
| 9,703,455 B2 | 7/2017 | Cocco et al. |
| 9,781,294 B1 | 10/2017 | Chapman |
| 9,818,051 B2 | 11/2017 | Panek et al. |
| 9,891,875 B2 | 2/2018 | Kim et al. |
| 9,921,721 B2 | 3/2018 | Beavers et al. |
| 9,939,271 B1 | 4/2018 | Foster et al. |
| 10,001,376 B1 | 6/2018 | Tiana et al. |
| 10,061,480 B1 | 8/2018 | McCusker et al. |
| 10,170,010 B1 | 1/2019 | McCusker et al. |
| 10,372,292 B2 | 8/2019 | Vogel et al. |
| 10,674,075 B2 | 6/2020 | Kimura |
| 10,684,769 B2 | 6/2020 | Yamat et al. |
| 10,872,274 B2 | 12/2020 | Mao et al. |
| 10,880,522 B2 | 12/2020 | McCutchen et al. |
| 10,984,501 B2 | 4/2021 | Milan et al. |
| 11,030,477 B2 | 6/2021 | Becker et al. |
| 11,061,563 B1 | 7/2021 | Nielsen et al. |
| 11,106,329 B2 | 8/2021 | He et al. |
| 2004/0071351 A1 | 4/2004 | Rade |
| 2005/0030321 A1 | 2/2005 | Anwar |
| 2005/0091340 A1 | 4/2005 | Facemire et al. |
| 2006/0031006 A1 | 2/2006 | Stenbock et al. |
| 2006/0215915 A1 | 9/2006 | Kim |
| 2007/0067095 A1 | 3/2007 | King |
| 2007/0094591 A1* | 4/2007 | Etgen ............... G06F 40/154 715/234 |
| 2007/0112517 A1 | 5/2007 | Goldstein |
| 2007/0185651 A1 | 8/2007 | Motoyama et al. |
| 2008/0046254 A1 | 2/2008 | Nuno et al. |
| 2008/0103641 A1 | 5/2008 | Ratcliffe |
| 2008/0240152 A1 | 10/2008 | Quinn et al. |
| 2009/0080801 A1 | 3/2009 | Hatfield et al. |
| 2009/0123070 A1 | 5/2009 | Xiaoying |
| 2009/0125837 A1 | 5/2009 | Hatem et al. |
| 2010/0128020 A1 | 5/2010 | Oh et al. |
| 2010/0218089 A1 | 8/2010 | Chao et al. |
| 2010/0262318 A1 | 10/2010 | Ariens |
| 2011/0191014 A1 | 8/2011 | Feng et al. |
| 2012/0242687 A1* | 9/2012 | Choi ............... G09G 5/005 345/660 |
| 2012/0287151 A1 | 11/2012 | James et al. |
| 2014/0168277 A1* | 6/2014 | Ashley ............... G09G 5/14 345/672 |
| 2014/0225928 A1 | 8/2014 | Konnola et al. |
| 2014/0282038 A1 | 9/2014 | Royster et al. |
| 2015/0070373 A1 | 3/2015 | Clinton |
| 2015/0239574 A1 | 8/2015 | Ball et al. |
| 2015/0278626 A1 | 10/2015 | Nakamura |
| 2015/0324088 A1 | 11/2015 | Pasetto et al. |
| 2016/0092557 A1 | 3/2016 | Stojanovic et al. |
| 2018/0181646 A1 | 6/2018 | Balasa et al. |
| 2018/0253889 A1 | 9/2018 | Nagasaka |
| 2019/0057671 A1 | 2/2019 | Baer et al. |
| 2019/0220234 A1 | 7/2019 | Lewis et al. |
| 2019/0299701 A1 | 10/2019 | Bartels |
| 2020/0089694 A1 | 3/2020 | Cabra et al. |
| 2020/0195924 A1 | 6/2020 | Hsiang |
| 2020/0251029 A1 | 8/2020 | Tseng |
| 2020/0255350 A1 | 8/2020 | Baek |
| 2020/0320142 A1 | 10/2020 | Malak et al. |
| 2020/0386567 A1 | 12/2020 | Igarashi |
| 2021/0004930 A1 | 1/2021 | Kamath et al. |
| 2021/0035453 A1 | 2/2021 | Khan et al. |
| 2021/0056300 A1 | 2/2021 | Chitta et al. |
| 2021/0192202 A1 | 6/2021 | Tripuraneni et al. |
| 2021/0225181 A1 | 7/2021 | Feyereisen et al. |
| 2021/0349615 A1 | 11/2021 | Ruby et al. |

FOREIGN PATENT DOCUMENTS

| | | |
|---|---|---|
| CN | 101751449 A | 6/2010 |
| CN | 101676988 B | 12/2011 |
| CN | 107026958 A | 8/2017 |
| CN | 107402734 A | 11/2017 |
| CN | 109325083 A | 2/2019 |
| CN | 110727747 A | 1/2020 |
| EP | 0341645 A2 | 11/1989 |
| EP | 0380294 A1 | 8/1990 |
| EP | 1352315 A2 | 10/2003 |
| EP | 1454213 A2 | 9/2004 |
| EP | 1272977 B1 | 12/2004 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 2009282855 A | 12/2009 |
| JP | 4728744 B2 | 7/2011 |
| WO | 1998043208 A3 | 1/1999 |
| WO | 2011036499 A1 | 3/2011 |
| WO | 2021035223 A1 | 2/2021 |

OTHER PUBLICATIONS

Bongwon Suh, Haibin Ling, Benjamin B. Bederson, and David W. Jacobs. 2003. Automatic thumbnail cropping and its effectiveness.

(56) References Cited

OTHER PUBLICATIONS

In Proceedings of the 16th annual ACM symposium on User interface software and technology (UIST 03). Association for Computing Machinery, New York, NY, USA, 95-104.
Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Pamental, Jason, "Digging in to dynamic typography", Retrieved from Internet, Nov. 11, 2021, 11 pages.
Pamental, Jason, "The evolution of typography with variable fonts", Retrieved from the Internet, Nov. 11, 2021.
Penquerch, "[AD] RLE clipping speedup patch" (2002), Retrieved from Internet, Nov. 11, 2021.
QGIS: Open-source cross-platform GIS software, Retrieved from Internet, Nov. 11, 2021.
Somasundaram, K. "A Method for Filling Holes in Objects of Medical Images Using Region Labeling and Run Length Encoding Schemes." (2010).
Anonymous: "Pilot's Guide to ForeFlight Mobile 82nd Edition Covers ForeFlight Mobile v12.7", Aug. 26, 2020, pp. 161-165.
Anonymous: Pilot's Guide to ForeFlight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023, European Application No. 22207047.6.
Extended European Search Report dated Apr. 5, 2023; European Application No. 22207057.5.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitude Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.
Extended European Search Report dated Mar. 24, 2023; European Application No. 22207029.4.
Anonymous: "algorithm—Contour of a run-length-coded digital shape", Stack Overflow, Dec. 31, 2015, pp. 1-5, URL:https://stackoverflow.com/questions/32354807/contour-of-a-run-length-coded-digital-shape.
Extended European Search Report dated Apr. 4, 2023; European Application No. 22207012.0.
Extended European Search Report dated Apr. 5, 2023; European Application No. 22207019.5.
Extended European Search Report dated Apr. 11, 2023; European Application No. 22207049.2.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
Extended European Search Report dated Apr. 21, 2023; European Application No. 22207060.9.
Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.

\* cited by examiner

SYSTEM AND METHOD FOR PROVIDING MORE READABLE FONT CHARACTERS IN SIZE ADJUSTING AVIONICS CHARTS

CROSS-REFERENCE TO RELATED APPLICATION

The present application claims the benefit under 35 U.S.C. § 119(e) of U.S. Provisional Application Ser. No. 63/278,576 filed Nov. 12, 2021, entitled SYSTEMS AND METHODS FOR GENERATION, SELECTION, AND DISPLAY OF MAP-BASED CHART DATABASES FOR USE WITH CERTIFIED AVIONICS SYSTEMS, naming Jeff M. Henry, Kyle R. Peters, Todd E. Miller, Jason L. Wong, Reed A. Kovach, and Srinath Nandakumar as inventors, which is incorporated herein by reference in the entirety.

BACKGROUND

Digital flight charts (i.e., aeronautical charts) are usually provided by third-party vendors in a format such as PDF. Text characters in the flight charts are commonly presented as filled characters (e.g., characters drawn using a plurality of filled triangles) which grow in thickness at higher zoom levels (zoomed in) but are hard to read at lower zoom levels (zoomed out). In contrast, stroked characters (e.g., characters drawn using a plurality of line segments) remain at a constant thickness at higher zoom levels but are easier to read at lower zoom levels. Flight charts presented on flight displays require both stroked characters and filled characters depending on the zoom level (sometimes for the same letter). Furthermore, flight charts may be generated off-line when the zoom level is not known. A method that solves the above problems by presenting either filled or stroked characters at the appropriate zoom level is desirable.

SUMMARY

A system for flight chart font character scaling is disclosed in accordance with one or more illustrative embodiments of the present disclosure. In one illustrative embodiment, the system comprises a host computing device including one or more processors configured to execute program instructions causing the one or more processors to: detect a respective font character size of one or more font characters in a flight chart file; associate a respective threshold zoom level with each of the font character(s) based on the respective font character size; replace the font character(s) with one or more font character references, wherein each of the font character reference(s) is associated with the respective threshold zoom level; and convert the flight chart file, including the font character reference(s) and the respective threshold zoom level associated with each of the font character reference(s), to a flight chart defined in aircraft display hardware directives.

In another illustrative embodiment, the system comprises an aircraft display configured to display the flight chart using the aircraft display hardware directives.

In another illustrative embodiment, the system comprises an aircraft computing device including one or more processors configured to execute program instructions causing the one or more processors to: detect a current zoom level of the aircraft display; responsive to the current zoom level being greater than the respective threshold zoom level of one of the font character reference(s), set a drawing mode of the one of the font character reference(s) as a filled character mode, or, responsive to the current zoom level being less than the respective threshold zoom level of the one of the font character reference(s), set the drawing mode of the one of the font character reference(s) as a stroked character mode; and responsive to the drawing mode being set as the filled character mode, present a referenced character of the one of the font character reference(s) as a filled character on the aircraft display, or, responsive to the drawing mode being set as the stroked character mode, present the referenced character of the one of the font character reference(s) as a stroked character on the aircraft display.

A method for flight chart font character scaling is disclosed in accordance with one or more illustrative embodiments of the present disclosure. In one illustrative embodiment, the method comprises, using a host computing device, detecting a respective font character size of one or more font characters in a flight chart file, associating a respective threshold zoom level with each of the font character(s) based on the respective font character size, replacing the font character(s) with one or more font character references, wherein each of the font character reference(s) is associated with the respective threshold zoom level, converting the flight chart file, including the font character reference(s) and the respective threshold zoom level associated with each of the font character reference(s), to a flight chart defined in aircraft display hardware directives, wherein an aircraft display is configured to display the flight chart using the aircraft display hardware directives.

In another illustrative embodiment, the method comprises, using an aircraft computing device, detecting a current zoom level of the aircraft display, responsive to the current zoom level being greater than the respective threshold zoom level of one of the font character reference(s), setting a drawing mode of the one of the font character reference(s) as a filled character mode, or, responsive to the current zoom level being less than the respective threshold zoom level of the one of the font character reference(s), setting the drawing mode of the one of the font character reference(s) as a stroked character mode; and responsive to the drawing mode being set as the filled character mode, presenting a referenced character of the one of the font character reference(s) as a filled character on the aircraft display, or, responsive to the drawing mode being set as the stroked character mode, presenting the referenced character of the one of the font character reference(s) as a stroked character on the aircraft display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Aeronautical charts (flight charts) are used by pilots to navigate aircraft during departing and landing phases (e.g., using terminal flight charts) and during en-route phases (e.g., using en-route flight charts). Using flight charts and other tools, pilots are able to determine position of the aircraft, safe altitudes for the aircraft, best route to a destination, navigation aids, alternative landing areas in case of an in-flight emergency, and other useful information such as radio frequencies and airspace boundaries. Specific charts are used for each phase of a flight and may vary from a map of a particular airport facility to an overview of the instrument routes covering an entire continent (e.g., global navigation charts).

Digital flight charts are usually provided by third-party vendors in a format such as PDF. Text characters in the flight charts are commonly presented as filled characters (e.g., characters drawn using a plurality of filled triangles) which increase in thickness at higher zoom levels (zoomed in) but are hard to read at lower zoom levels (zoomed out). In contrast, stroked characters (e.g., characters drawn using a plurality of line segments) remain at a constant thickness at higher zoom levels but are easier to read at lower zoom levels. Flight charts shown on aircraft displays require both stroked characters and filled characters depending on the zoom level (sometimes for the same letter). However, due to limited memory resources on an aircraft computing device, referencing different fonts for both stroked and filled characters is disadvantageous. Furthermore, flight charts may be generated off-line when the zoom level is not known. Thus, it is desirable to solve the above problems by presenting the appropriate character (filled or stroked) at different zoom levels on an aircraft display while conserving aircraft hardware resources.

Embodiments of the present disclosure are directed to a system and method for flight chart font character scaling. The present system and method detects the size of a font character in a flight chart, and associates a threshold zoom level based on the font character size. Smaller characters (e.g., 12 point characters) may be set to stroked when the zoom level of an aircraft display is lower than a relatively low threshold zoom level (e.g., 1.25 times the baseline zoom level), whereas larger characters (e.g., 48 point characters) may be set to stroked when the zoom level of the aircraft display is lower than a relatively high zoom level (e.g., 2.0 times the baseline zoom level). The association of the threshold zoom level for each size of font character may be performed off-line during the processing of the flight chart on a host computing device, and before the zoom level of the aircraft display is known. The font characters may then be set as filled or stroked at run-time (using an aircraft computing device) based on a comparison of the associated threshold zoom level and a current zoom level of an aircraft display.

Figure 1:
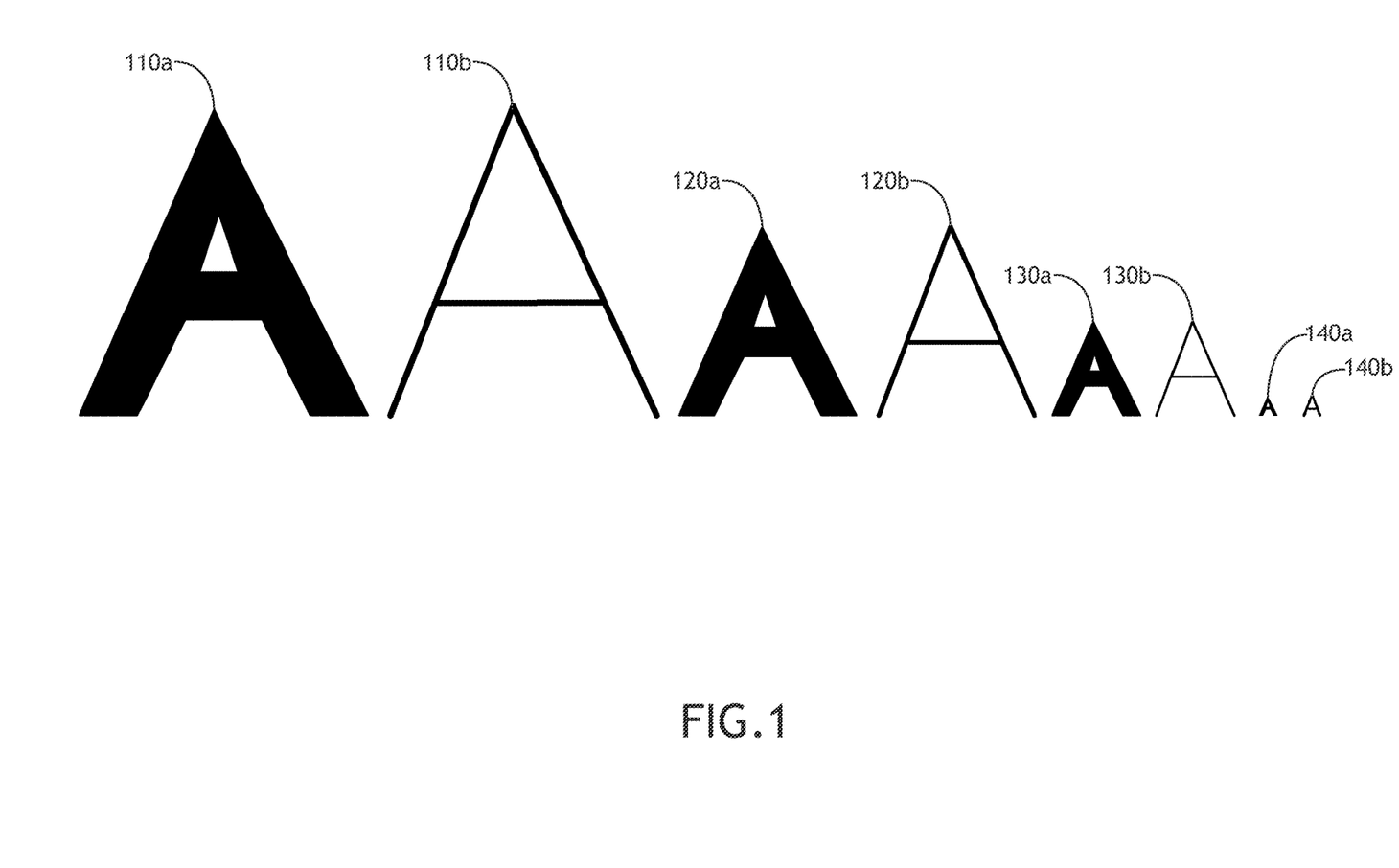
FIG. 1 is a conceptual image illustrating sizes of filled characters and stroked characters at different zoom levels.

FIG. 1 is a conceptual image illustrating font character sizes of filled font characters and stroked font characters. The image shows four different font character sizes (large, medium, small and very small) of the letter "A." The image shows a large filled character 110a, a large stroked character 110b, a medium filled character 120a, a medium stroked character 120b, a small filled character 130a, a small stroked character 130b, a very small filled character 140a and a very small stroked character 140b. At the zoom level shown in FIG. 1, the large filled character 110a is more easily discernable (i.e., readable) than the large stroked character 110b. Likewise, the medium filled character 120a is more easily discernable than the medium stroked character 120b and the small filled character 130a is more discernable than the small stroked character 130b. In contrast, the very small stroked character 140b is more discernable than the very small filled character 140a at the same zoom level. Thus, for the zoom level shown in FIG. 1, it may be advantageous to present the large characters 110, the medium characters 120, and the small characters 130 as filled characters, and present the very small characters 140 as stroked characters.

Figure 2:
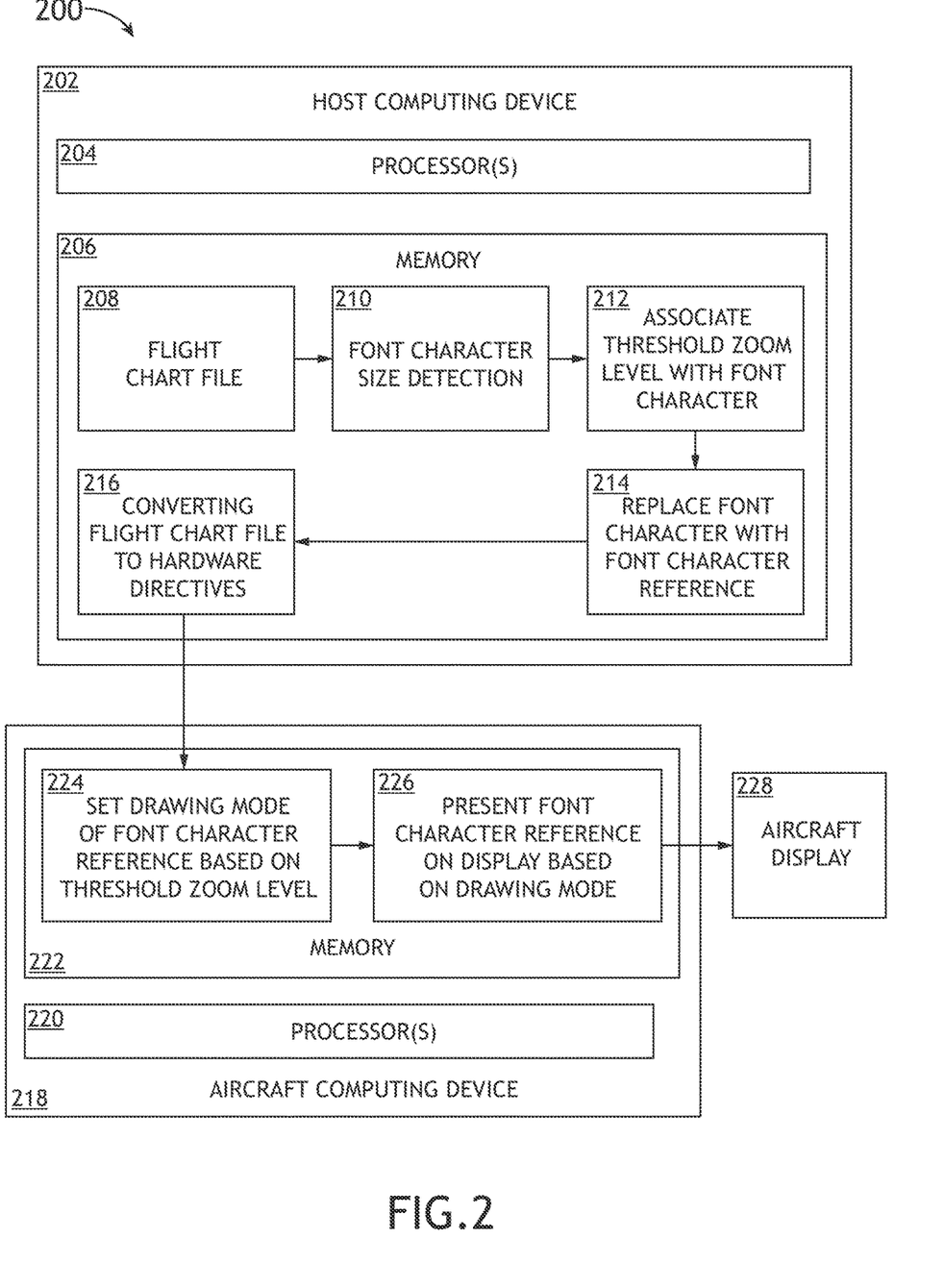
FIG. 2 is a block diagram illustrating a system for flight chart font character scaling, in accordance with one or more embodiments of the present disclosure

FIG. 2 is a block diagram illustrating a system 200 for flight chart font character scaling, in accordance with one or more embodiments of the present disclosure. The system includes a host computing device 202, and aircraft computing device 218, and an aircraft display 228.

The host computing device 202 and the aircraft computing device 218 may be controllers (e.g., computers), each respectively including one or more processors 204, 220 and a memory 206, 222. For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs), etc. In this sense, the one or more processors 204, 220 may include any device configured to execute algorithms and/or instructions (e.g., program instructions or modules stored in memory), and may be configured to perform the method steps described in the present disclosure. For example, the processors 204 may execute the modules 210, 212, 212, 214 and 216, and the processors 220 may be configured to execute the modules 224 and 226. The memories 206, 222 may include any storage medium known in the art suitable for storing program instructions executable by the associated processors 204, 220. For example, the memories 206, 222 may include, but are not limited to, a read-only memory (ROM), a random-access memory (RAM), a magnetic or optical memory device (e.g., hard disk), a magnetic tape, a solid-state drive, and the like.

The host computing device 202 may be, for example, a personal computer (PC), a laptop, a smartphone, a tablet, a server, a mainframe, etc. In some embodiments, the host computing device may operate using a Microsoft® Windows® operating system, an Apple® macOS® operating system, a Linux-based operating system, etc. In some embodiments, the host computing device may comprise a plurality of computing devices (e.g., a cloud-based system). It is noted that the host computing device 202 may be a ground-based computing device (e.g., not a part of an aircraft). The aircraft computing device(s) 218 may comprise one or more avionics embedded systems (e.g., an avionics suite), and may include a flight management system (FMS) computing device, a communications computing device, a navigation computing device, a flight display computing device, a flight control computing device, a fuel management computing device, a collision-avoidance computing device, a weather computing device, etc. The aircraft display 228 may be an LCD or CRT monitor, for example, a primary flight display (PFD), a multifunction display (MFD), and may be configured to present a flight chart (e.g., defined in aircraft display hardware directives) to a user of an aircraft.

A flight chart file 208 may be stored on the memory 206 of the host computing device. The flight chart file 208 may be a portable document format (PDF) flight chart file, however the present disclosure is not limited thereto, and it is contemplated that the flight chart file 208 may be any industry standard flight chart file that includes text. In some embodiments, a scalable vector graphics (SVG) file defined in extensible mark-up language (XML) or a comma-separated values (CSV) flight chart file may be converted to generate the flight chart file 208. The flight chart file 208 may be an image representing terminal flight charts, en-route flight charts, nautical charts, world aeronautical charts, sectional charts, etc. The image may show topographical features such as terrain elevations, ground features identifiable from altitude (rivers, dams, bridges, buildings, airports, beacons, landmarks, etc.), and information related to airspace classes, ground-based navigation aids, radio frequencies, longitude and latitude, navigation waypoints, navigation routes, etc. The flight chart file 208 may be associated with metadata such as flight chart name (e.g., "Omaha Eppley Airfield"), flight chart type (e.g., terminal, en-route, world aeronautical, etc.), flight chart location, etc.

A plurality of modules (e.g., program instructions) 210, 212, 214, and 216 stored on the memory 206 may process the flight chart file 208. The modules 210, 212, 214, and 216 may be submodules of a flight chart processing module. The flight chart processing module may be substantially similar or substantially identical to the Electronic Charts Application Tool Suite developed by Collins Aerospace (Cedar Rapids, IA), and may be configured to convert an original flight chart file (in PDF, CSV, SVG, etc.) to a converted flight chart file (e.g., in PDF or SVG), process and simplify the flight chart file, convert the flight chart file to aircraft display hardware directives, and compress the aircraft display hardware directives.

The module 210 may be configured to detect a font character size of one or more font characters (e.g., after the detection of the font character using an image recognition algorithm configured to identify flight chart elements) in the flight chart file 208. For example, the font character size of each font character may be detected as 12 point, 24 point, 48 point, 72 point, etc. The detected font character size may be of from 1 point to 1638 pixels or more.

The module 212 may be configured to associate a threshold zoom level with each font character based on the respective font character size. For example, for a 12 point font character, the associated threshold zoom level may be set to 1.25 times the baseline zoom level (125% magnification, where the baseline zoom level is 100% magnification). In contrast, for larger characters such as a 48 point font character, the associated threshold zoom level may be set to 2.0 times the baseline zoom level (200% magnification). The threshold zoom level associated with each font character (determined off-line on the host computing device 202) may be used to set the respective font character as filled or stroked (determined at run-time on the aircraft computing device 218).

The term "zoom level" may be regarded as the scaling applied to render the flight chart on the aircraft display 228. At the baseline zoom level (100% magnification) each pixel of the flight chart is represented as 100% of a pixel on the display 228. At 2.0 times the baseline zoom level (200%), each pixel of the image is represented as 200% of a pixel on the display 228 (2 pixels vertically and 2 pixels horizontally), and therefore is displayed as 4 pixels on the aircraft display 228. At 0.5 times the baseline zoom level (50%), each pixel of the image is represented as 50% of a screen pixel on the display 228, such that a single pixel of the aircraft display 228 represents 4 pixels in the image (since the image pixels are scaled 50% horizontally and vertically).

The module 214 may be configured to replace the font character(s) with one or more font character references in the flight chart file 208. Each of the font character reference(s) may be a name or container that calls font character values (e.g., pixel locations and pixel values) stored in the flight chart file 208. In this way, the font character reference(s) may be pointers that store memory addresses, and the memory addresses in turn may store the actual font character values (i.e., indirection). The font character reference(s) reduce the size of the flight chart file 208 and conserve the resources of the memory 222 of the aircraft computing device 218 (e.g., after the flight chart file 208 is converted to aircraft display hardware directives). The font character reference(s) may also be associated with the respective threshold zoom level determined by the module 212.

The module 216 may convert the flight chart file 208 to a flight chart defined in aircraft display hardware directives. Each of the aircraft display hardware directives may have a 32 bit form with 8 bits allocated to an opcode (e.g., that specifies a graphic operation to be performed, such as DRAW, MOVE, SETCOLOR) and 24 bits allocated to pixel data and pixel address (e.g., color of pixel(s), location of pixel(s), etc.). The aircraft display hardware directives may be quickly and easily displayed to a pilot on the aircraft display 228. The aircraft display hardware directives may decrease loading times and conserve processing and memory resources of the aircraft computing device 218 (since PDF or SVG flight chart files are too large to store on the memory 222 of the aircraft computing device 218, and may require long loading times to display on the aircraft display 228).

The flight chart file defined in aircraft display hardware directives may then be loaded on the memory 222 of the aircraft computing device 218. The module 224 may be configured to detect a current zoom level of the aircraft display 228. The current zoom level of the aircraft display 228 may be set by a user of the aircraft (for example, using a button, a knob, a mouse, a keyboard, etc.).

The module 224 may be configured to compare the respective threshold zoom level of a font character reference to the current zoom level, and based on the comparison, set a drawing mode (of the font character reference) as a filled character mode or a stroked character mode. For example, if the current zoom level is greater than the respective threshold zoom level, the drawing mode of the respective font character reference may be set as a filled character mode. Otherwise, if the current zoom level is less than the respective threshold zoom level, the drawing mode of the respective font character reference may be set as a stroked character mode.

The module 226 may be configured to draw a referenced character of a font character reference based on the drawing mode. The referenced character may comprise font character values stored in a memory address on the memory 222 (stored separately from the flight chart). If the drawing mode is set as the filled character mode, the referenced character is presented as a filled character on the aircraft display 228. Otherwise, if the drawing mode is set as the stroked character mode, the referenced character is presented as a stroked character on the aircraft display 228. It is noted that the filled character may be drawn on the flight display 228 using a plurality of filled triangles, and the stroked character may be drawn on the flight display 228 using a plurality of line segments. Additionally or alternatively, the filled character may be drawn using a plurality of lines (for example, wide lines may be used for smaller fill regions instead of the plurality of triangles).

Figure 3:
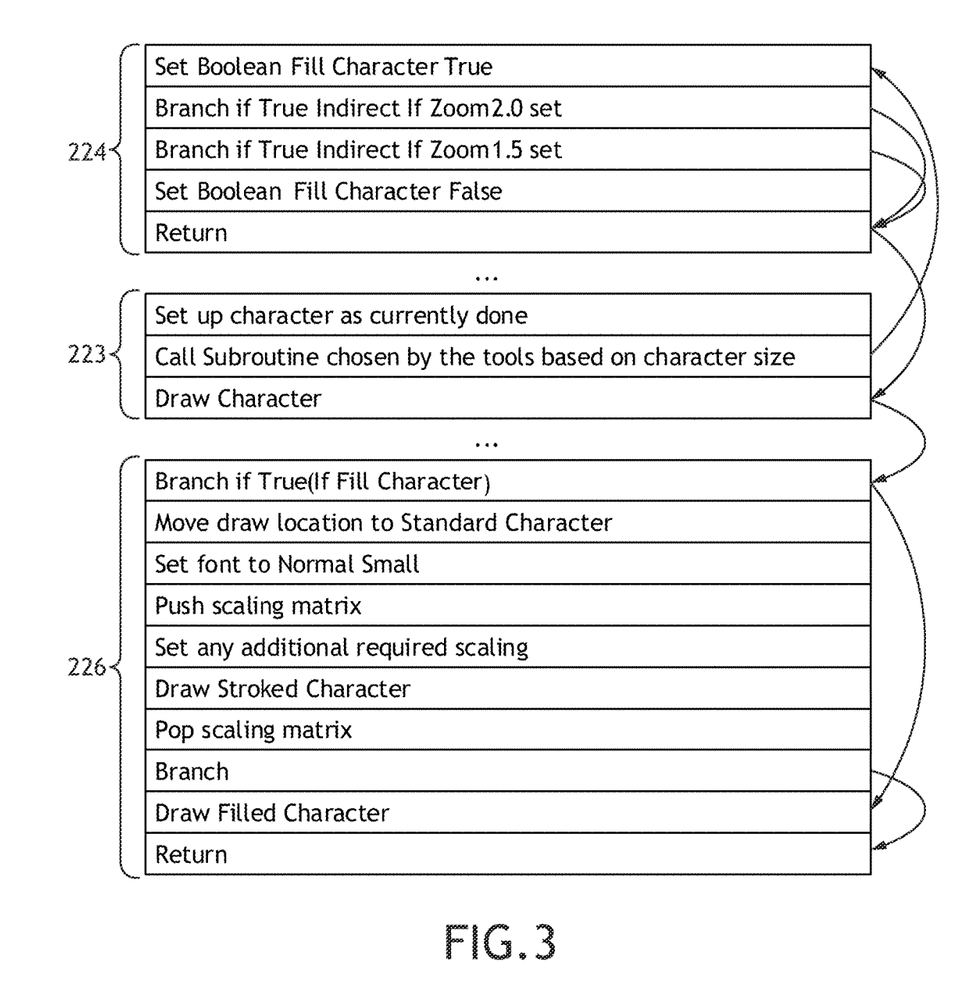
FIG. 3 is a conceptual diagram illustrating the program flow of modules configured to draw a font character as filled or stroked, in accordance with one or more embodiments of the present disclosure.

FIG. 3 is a conceptual diagram illustrating the program flow of modules 223, 224, and 226 that draw a font character as filled or stroked based on a detected font character size, in accordance with one or more embodiments of the present disclosure. The module 223 may first call the module 224 to set the drawing mode of the font character reference. Then, the module 223 may call the module 226 to draw the referenced character as stroked or filled based on the drawing mode of the font character reference. Checking the drawing mode within the module 226 saves memory space since multiple Boolean checks, relocation of stylus position, and matrix manipulation only occurs once per font character size (for example, once for all of the 12 point font characters) instead of once per font character (instead of once per 12 point "A," once per 12 point "B," and so on, which is computationally costly). Additionally, for sequences of identically sized font characters, the module 224 does not have to be called repeatedly since the drawing mode remains set (as a Boolean value).

Figure 4:
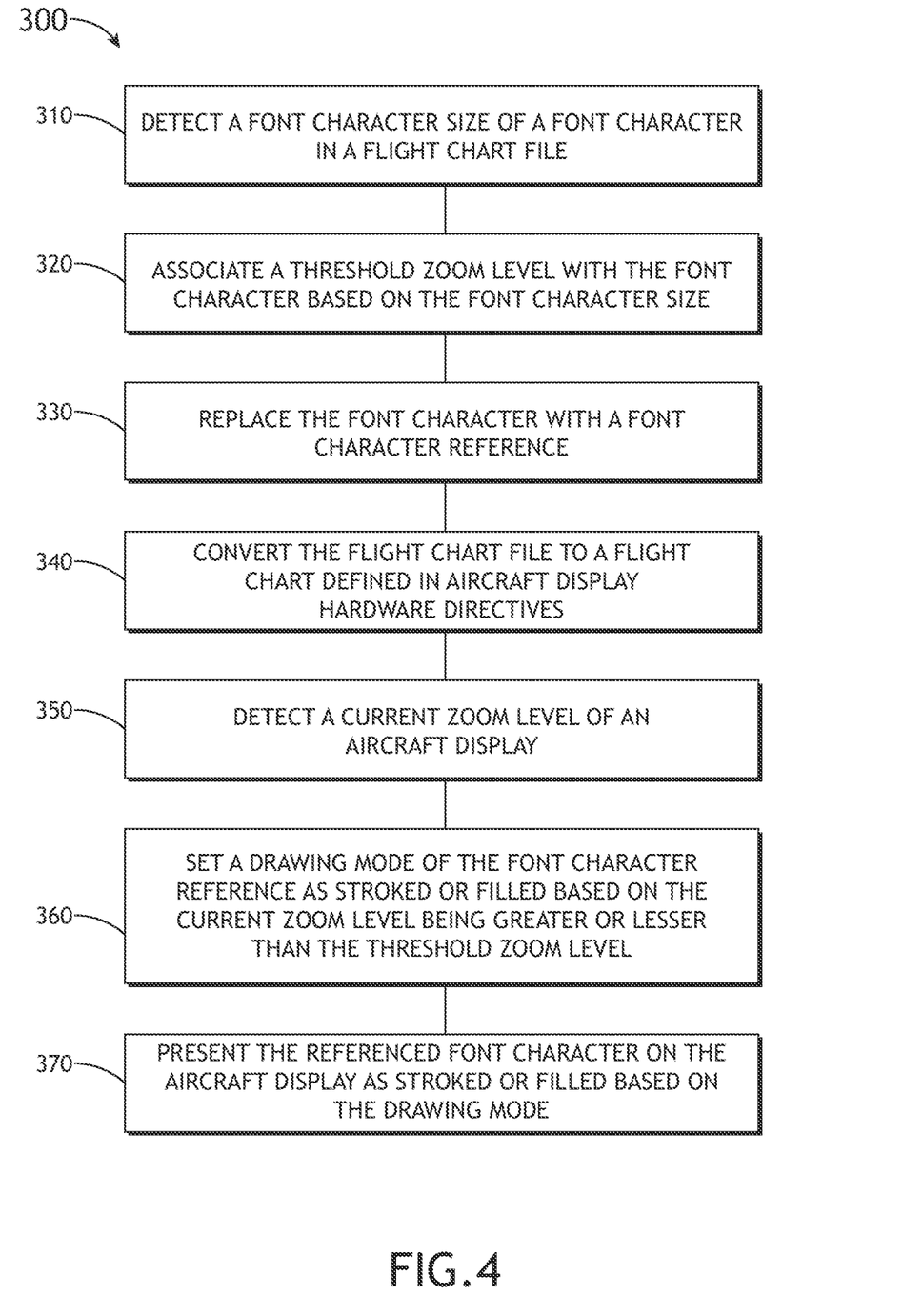
FIG. 4 is a flowchart illustrating a method for flight chart font character scaling, in accordance with one or more embodiments of the present disclosure.

FIG. 4 is a flowchart illustrating a method 300 for flight chart font character scaling, in accordance with one or more embodiments of the present disclosure. The method 300 may be implemented by the system 200 as described with respect to FIGS. 2 and 3. Steps 310, 320, 330, and 340 may be performed using a host computing device (e.g., host computing device 202 described with respect to FIG. 2), and steps 350, 260 and 370 may be performed using an aircraft computing device (e.g., aircraft computing device 218 described with respect to FIG. 2)

At step 310, a font character size of one or more font characters may be detected in a flight chart file. For example, the font character size of each font character may be detected as 12 point, 24 point, 48 point, 72 point, etc. The detected font character size may be of from 1 point to 1638 pixels or more.

At step 320, a threshold zoom level may be associated with each font character based on the respective font character size. For example, for a 12 point font character, the associated threshold zoom level may be set to 1.25 times the baseline zoom level (125% magnification, where the baseline zoom level is 100% magnification). In contrast, for larger characters such as a 48 point font character, the associated threshold zoom level may be set to 2.0 times the baseline zoom level (200% magnification). The threshold zoom level associated with each font character (determined off-line on the host computing device) may be used to set the respective font character as filled or stroked (determined at run-time on the aircraft computing device).

At step 330, the one or more font characters may be replaced with one or more font character references in the flight chart file. Each of the font character references may be a name or container that calls font character values (e.g., pixel locations and pixel values) stored in the flight chart file. In this way, the font character references may be pointers that store memory addresses (in other words, a form of indirection), and the memory addresses in turn may store the actual font character values. The font character reference(s) may also be associated with the respective threshold zoom level determined by the module 212.

At step 340, the flight chart file may be converted to a flight chart defined in aircraft display hardware directives. Each of the aircraft display hardware directives may have a 32 bit form with 8 bits allocated to an opcode (e.g., that specifies a graphic operation to be performed, such as DRAW, MOVE, SETCOLOR) and 24 bits allocated to pixel data and pixel address (e.g., color of pixel(s), location of pixel(s), etc.).

At step 350, the flight chart file defined in aircraft display hardware directives may then be loaded on the memory of the aircraft computing device. A current zoom level of an aircraft display may be detected. The current zoom level of the aircraft display may be set by a user of the aircraft (for example, using a button, a knob, a mouse, a keyboard, etc.).

At step 360, the respective threshold zoom level of a font character reference may be compared to the current zoom level, and based on the comparison, a drawing mode (of the font character reference) may be set as a filled character mode or a stroked character mode. For example, if the current zoom level is greater than the respective threshold zoom level, the drawing mode of the respective font character reference may be set as a filled character mode. Otherwise, if the current zoom level is less than the respective threshold zoom level, the drawing mode of the respective font character reference may be set as a stroked character mode.

At step 370, a referenced character of the font character reference may be drawn based on the drawing mode. The referenced character may comprise font character values stored in a memory address on the memory of the aircraft computing device (stored separately from the flight chart). If the drawing mode is set as the filled character mode, the referenced character is presented as a filled character on the aircraft display. Otherwise, if the drawing mode is set as the stroked character mode, the referenced character is presented as a stroked character on the aircraft display. The filled character may be drawn on the flight display using a plurality of filled triangles and/or a plurality of lines (for example, wide lines may be used for smaller filled regions, while filled triangles may be used for larger filled regions). The stroked character may be drawn on the flight display using a plurality of line segments.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for flight chart font character scaling, comprising:
    a host computing device including one or more processors configured to execute program instructions causing the one or more processors to:
        detect a respective font character size of one or more font characters in a flight chart file;
        associate a respective threshold zoom level with each of the font character(s) based on the respective font character size;
        replace the font character(s) with one or more font character references, wherein each of the font character reference(s) is associated with the respective threshold zoom level; and
        convert the flight chart file, including the font character reference(s) and the respective threshold zoom level associated with each of the font character reference(s), to a flight chart defined in aircraft display hardware directives;
    an aircraft display configured to display the flight chart using the aircraft display hardware directives; and
    an aircraft computing device including one or more processors configured to execute program instructions causing the one or more processors to:
        detect a current zoom level of the aircraft display;
        responsive to the current zoom level being greater than the respective threshold zoom level of one of the font character reference(s), set a drawing mode of the one of the font character reference(s) as a filled character mode, or, responsive to the current zoom level being less than the respective threshold zoom level of the one of the font character reference(s), set the drawing mode of the one of the font character reference(s) as a stroked character mode; and
        responsive to the drawing mode being set as the filled character mode, present a referenced character of the one of the font character reference(s) as a filled character on the aircraft display, or, responsive to the drawing mode being set as the stroked character mode, present the referenced character of the one of the font character reference(s) as a stroked character on the aircraft display.

2. The system of claim 1, wherein the respective threshold zoom level is 1.25 times a baseline zoom level.

3. The system of claim 1, wherein the respective threshold zoom level is 1.5 times a baseline zoom level.

4. The system of claim 1, wherein the respective threshold zoom level is 2.0 times a baseline zoom level.

5. The system of claim 1, wherein the detected respective font character size is of from a 1-point font size to a 240-point font size.

6. The system of claim 1, wherein the filled character is presented on the flight display by drawing at least one of a plurality of filled triangles or a plurality of lines.

7. The system of claim 1, wherein the flight chart file is a portable document format (PDF) flight chart file.

8. The system of claim 1, wherein the flight chart file is a scalable vector graphics (SVG) flight chart file defined in extensible mark-up language (XML).

9. The system of claim 1, wherein the stroked character is presented on the flight display by drawing a plurality of line segments.

10. A method for flight chart font character scaling, comprising:
    using a host computing device,
    detecting a respective font character size of one or more font characters in a flight chart file,
    associating a respective threshold zoom level with each of the font character(s) based on the respective font character size,
    replacing the font character(s) with one or more font character references, wherein each of the font character reference(s) is associated with the respective threshold zoom level,
    converting the flight chart file, including the font character reference(s) and the respective threshold zoom level associated with each of the font character reference(s), to a flight chart defined in aircraft display hardware directives, wherein an aircraft display is configured to display the flight chart using the aircraft display hardware directives,
    using an aircraft computing device,
    detecting a current zoom level of the aircraft display,
    responsive to the current zoom level being greater than the respective threshold zoom level of one of the font character reference(s), setting a drawing mode of the one of the font character reference(s) as a filled character mode, or, responsive to the current zoom level being less than the respective threshold zoom level of the one of the font character reference(s), setting the drawing mode of the one of the font character reference(s) as a stroked character mode; and responsive to the drawing mode being set as the filled character mode, presenting a referenced character of the one of the font character reference(s) as a filled character on the aircraft display, or, responsive to the drawing mode being set as the stroked character mode, presenting the referenced character of the one of the font character reference(s) as a stroked character on the aircraft display.

11. The method of claim 10, wherein the respective threshold zoom level is 1.25 times a baseline zoom level.

12. The method of claim 10, wherein the respective threshold zoom level is 1.5 times a baseline zoom level.

13. The method of claim 10, wherein the respective threshold zoom level is 2.0 times a baseline zoom level.

14. The method of claim 10, wherein the filled character is presented on the flight display by drawing at least one of a plurality of filled triangles or a plurality of lines.

15. The method of claim 10, wherein the flight chart file is a portable document format (PDF) flight chart file.

16. The method of claim 10, wherein the flight chart file is a scalable vector graphics (SVG) flight chart file defined in extensible mark-up language (XML).

17. The method of claim 10, wherein the stroked character is presented on the flight display by drawing a plurality of line segments.

* * * * *